Figure 1:
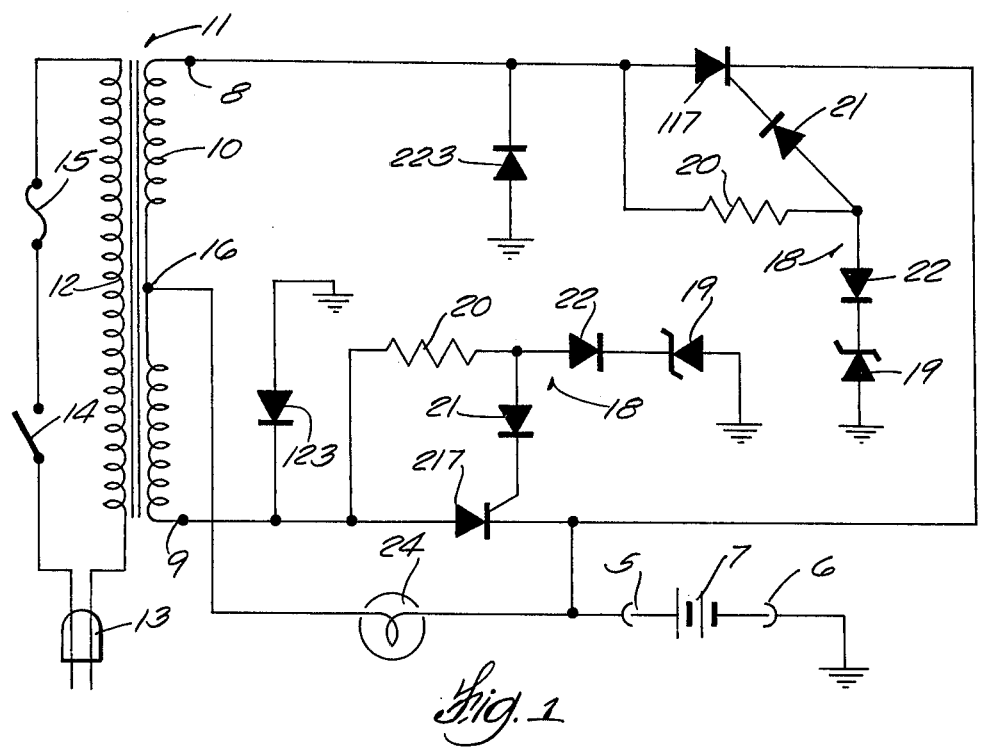

United States Patent [19]
Heindl

[11] 3,916,280
[45] Oct. 28, 1975

[54] BATTERY CHARGER WITH STATE-OF-CHARGE INDICATOR

[75] Inventor: Kenneth J. Heindl, West Allis, Wis.

[73] Assignee: Briggs & Stratton Corporation, Wauwatosa, Wis.

[22] Filed: Jan. 9, 1975

[21] Appl. No.: 539,579

[52] U.S. Cl. ................................ 320/48; 322/99
[51] Int. Cl.² ........................................ H02J 7/00
[58] Field of Search .......... 322/99; 320/DIG. 2, 48, 320/39, 40; 315/78

[56] References Cited
UNITED STATES PATENTS
| | | | |
|---|---|---|---|
| 3,270,331 | 8/1966 | Kirk et al. | 320/48 X |
| 3,553,562 | 1/1971 | Woods | 320/48 X |

Primary Examiner—J. D. Miller
Assistant Examiner—Robert J. Hickey

[57] ABSTRACT

A lamp bulb serves as a state-of-charge indicator in a voltage-regulated battery charger. The charger comprises a winding across which an alternating voltage is induced and the ends of which comprise input terminals, an SCR connected between one input terminal and one output terminal, and a regulating circuit connected with the gate of the SCR and comprising a zener diode. The bulb is connected between said output terminal and a center tap on the winding, to burn when the SCR conducts. A rectifier diode connected between the other output terminal and the other input terminal prevents bulb energization when the SCR is not conducting.

2 Claims, 2 Drawing Figures

BATTERY CHARGER WITH STATE-OF-CHARGE INDICATOR

This invention relates to battery charging apparatus and is more particularly concerned with very simple and inexpensive means in a voltage-regulated battery charger for indicating the state of charge of a battery connected to the charger.

There are many applications in which an inexpensive voltage-regulated battery charger is needed for recharging a storage battery at more or less frequent intervals. As an example, an electric motor that powers a lawn mower may be energized from a storage battery carried on the mower, and at the end of each period of use of the mower its battery is recharged from a household current supply by connecting the battery with a charger that is plugged into a wall socket.

The charger can comprise a transformer and a few solid-state components, connected in a known manner to provide for rectification of the alternating current and for regulation of the charging voltage applied to the battery, and hence the charger itself can be relatively compact, inexpensive and sturdy. However, it is very desirable that such a charger be equipped with means for indicating the state of charge of a battery connected with it, to enable the battery to be fully charged at each charging and to be disconnected from the charger when charging is accomplished.

Heretofore the most frequently used state-of-charge indicator for such a battery charger — when such an indicator was provided — was an ammeter that was connected in its output circuit. The ammeter was expensive and relatively bulky, and, equally important, it comprised a rather delicate mechanism, whereas a battery charger of the type here being considered is likely to be stored and used in a garage or a shed where it is exposed to dust, dirt and high humidity and may be subjected to bumps, blows, extremes of temperature and other abuses. Often, too, the charger is used in a poorly lighted location, so that the indications of an ammeter are not readily visible. It is also probable that the analogue-type readout of an ammeter is confusing or annoying to many persons, inasmuch as it frequently confronts them with the need for interpretation or decision, whereas they would prefer a yes-or-no indication that tells them definitely and unambiguously whether or not battery charging can be terminated.

With these considerations in mind, it is an object of the present invention to provide a signaling device for a battery charger of the character described, for producing a readily perceptible and unambiguous output denoting whether or not a battery connected with the charger is fully charged, which signaling device is substantially less expensive than an ammeter and much more rugged and reliable, so that it is well adapted for inexpensive battery chargers.

In a preferred form of the present invention it comprises merely a small light bulb so connected in the battery charger circuit as to remain steadily lighted as long as a battery connected with the output terminals of the charger is not fully charged but to flash on and off after the battery reaches a fully charged condition.

In a companion application. Ser. No. 532,999 filed Dec. 16, 1974, there is disclosed and claimed another battery state-of-charge indicator arrangement, also comprising a light bulb. The indicator device of that application requires a zener diode in series with the light bulb in order to perform its indicating fucntion.

The present invention has for its object the provision of a device for indicating the state of charge of a storage battery connected with a battery charger, which indicating device can likewise comprise a small light bulb but does not require that a zener diode be connected in the indicator circuit.

As compared with the indicator device of the companion application just mentioned, that of the present invention requires a center tap of the winding which provides the alternating current input to the charging apparatus. In many cases the provision of that center tap will cost less than a zener diode, and with such cases in mind it is an object of the present invention to provide a state-of-charge indicator which serves essentially the same purpose as that of said companion application and has all of its advantages but is lower in cost.

There may be situations, however, in which the use of a center-tapped winding is inconvenient or impracticable or for some reason costs more than a zener diode. Furthermore, cost relationships as between electronic components are subject to change with the passage of time.

Having in mind the many and varying requirements and desiderata that must be weighed in designing a piece of apparatus like a battery charger, it is another object of the present invention to provide a very desirable alternative to the indicator device of the above mentioned companion application, so that with both inventions available and complementing one another, the art can make choices on the basis of suitability to prevailing economic conditions and to the particular type of charger under consideration.

With these observations and objectives in mind, the manner in which the invention achieves its purpose will be appreciated from the following description and the accompanying drawing, which exemplify the invention, it being understood that changes may be made in the specific apparatus disclosed herein without departing from the essentials of the invention set forth in the appended claims.

Figure 2:
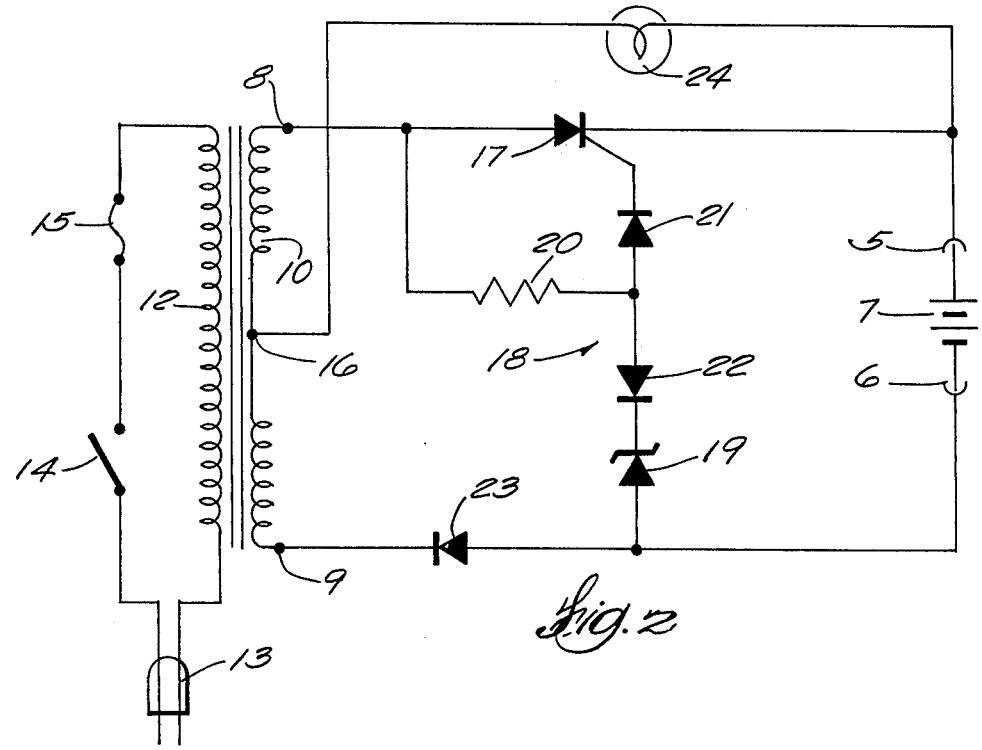

The accompanying drawing illustrates two complete examples of embodiments of the invention constructed according to the best modes so far devised for the practical application of the principles thereof, and in which:

FIG. 1 is a circuit diagram of a voltage-regulated full-wave battery charger incorporating a battery state-of-charge indicator that embodies the principles of this invention; and FIG. 2 is a circuit diagram illustrating a half-wave battery charger in which the indicator of this invention is incorporated.

Referring now to the accompanying drawing, a battery charger incorporating the state-of-charge indicator of this invention has a pair of output terminals 5 and 6 to which a storage battery 7 can be connected for charging, and has input terminals 8 and 9 that comprise the opposite ends of a winding 10 across which an alternating voltage is induced.

It will be understood that the alternating voltage across the input terminals 8 and 9 has a predetermined substantially constant peak value, and that the winding 10 could comprise the coils of an alternator although that winding is here illustrated as the secondary of a stepdown transformer 11. The primary winding 12 of the transformer is adapted to be connected with a household source of alternating current by means of a conventional plug 13 and through an on-off switch 14 and a fuse 15. Whether comprising the coils of an alternator or a transformer as shown, the winding 10 has a center tap 16 for a purpose described hereinafter.

Inasmuch as the apparatus illustrated in FIG. 1 provides for full-wave rectification of the charging current, each of the input terminals 8 and 9 is connected with the anode-cathode circuit of a controlled rectifier or SCR 117, 217, respectively, and both of the SCRs are connected with one output terminal 5. The other output terminal 6 is grounded.

To provide for regulation of the voltage across the output terminals in accordance with the state of charge of a battery 7 connected to them, each SCR has its gate connected in a more or less conventional regulator circuit 18 that comprises a zener diode 19, a resistor 20 and a pair of rectifier diodes 21 and 22 that are connected back-to-back. The resistor 20 associated with each SCR, which serves for current control, is connected between the input terminal (8 or 9) to which its SCR is connected and the junction of the back-to-back diodes 21, 22 for its SCR. Each diode 21 is so connected with the gate of its SCR that biasing current can flow through that diode and the resistor during the half-cycles of the a.c. wave that correspond to the forward direction to the SCR. The portions of those half-cycles during which each SCR will be biased into conductivity are controlled by its associated zener diode 19, which is connected between the diode 22 and ground. The diodes 21 and 22 that are associated with each SCR provide for voltage trimming and isolation.

The zener diodes 19 are so chosen that each has a breakdown or zener voltage value such that it cooperates with its associated resistor 19 to maintain at the gate of its SCR a substantially constant maximum potential that is approximately equal to the voltage that exists across the terminals of a fully charged battery. The zener diode bypasses current to ground as necessary to prevent the potential at the gate of its SCR from exceeding this maximum value. When the battery is fully charged, the potential at the gate of the SCR never exceeds that at the output terminal 5, and the SCR remains in its blocking condition. When the battery is not up to its full charge, there will be a potential difference between the gate of the SCR and the output terminal 5 during at least a portion of each a.c. half-cycle of the polarity for forward flow through the SCR, and when such potential difference exists, the SCR will be gated to pass charging current to the battery. The point in each such half-cycle at which the SCR becomes conductive will of course depend upon the voltage across the battery and the back voltage or zener value of the zener diode 19.

The SCRs 117 and 217 are of course arranged to conduct charging current alternately, each during its appropriate half-cycle of the a.c. wave. When the SCR 117 is conducting current from input terminal 8 to output terminal 5, return flow of current from the grounded output terminal 6 to the input terminal 9 is accommodated by a rectifier diode 123 connected between the input terminal 9 and ground. In like manner, when SCR 217 is conducting current from input terminal 9 to output terminal 5, return flow to input terminal 8 is accommodated by a rectifier diode 223 connected between the latter input terminal and ground.

The full-wave charging apparatus described up to this point is generally conventional, although such apparatus would not, in itself, require that the winding 10 have the center tap 16. That center tap is provided to accommodate the state-of-charge indicator of this invention, which comprises merely a small light bulb 24 connected between that center tap and the ungrounded output terminal 5.

The light bulb 24 is one that can be lit when the voltage across its terminals is about one-half (or somewhat less than half) of the voltage that prevails across the output terminals 5, 6 when an uncharged battery is connected to them.

It will be apparent that the light bulb will be steadily energized as long as the state-of-charge of a battery connected with the output terminals is such that charging current flows to it. The path for light bulb energizing current during one half of the a.c. cycle can be traced from input terminal 8, by way of SCR 117 to output terminal 5, thence through the bulb and to the center tap 16 of the winding. During the other half-cycle it can be traced from input terminal 9 and by way of SCR 217 to output terminal 5, thence through the bulb and to the center tap 16. During the first mentioned half-cycle, the current through the bulb flows only through the part of the winding 10 that is between terminals 8 and 16; during the other half-cycle it flows only through the part of said winding which is between terminals 9 and 16. The bulb is thus connected more or less in parallel with the battery, but not completely so inasmuch as the return connection of the bulb to the winding is at the center tap rather than to either of the end terminals 8, 9.

When the battery is in a fully charged condition, energizing current stops flowing through the bulb 24, because with both SCRs in blocking condition there is no complete circuit through the bulb, either by way of the battery or by way of the winding 10.

However, it is a characteristic of a fully charged battery that the voltage across its terminals will not maintain a peak value for more than a very short time before dropping slightly. If the battery is in good condition, such drop in its terminal voltage will diminish to practically a zero rate of decline very soon after the battery is disconnected from a source of charging current. In this way the battery will lose its peak charge shortly after the two SCRs cease conducting and the light bulb goes out. The SCRs will then begin conducting again, and the light bulb will be lighted as they do so. This "bulb-on" condition, like the "bulb-off" condition that preceded it, endures only briefly, since the battery soon returns to its peak charge condition and the SCRs stop conducting.

Such on and off cycling continues as long as the fully charged battery remains connected to the charger, and the flashing of the light bulb (in contrast to its previous steady illumination) affords a readily perceptible and unambiguous indication that the battery has attained fully charged condition. The flashing occurs rather rapidly when the battery first reaches full charge, then slows down to a rate of, very roughly, one flash per second.

Flashing of the bulb constitutes an appropriate type of signal, since it attracts attention to the fact that the battery should be disconnected from the charger, a flashing light being more conspicuous than a steady one.

It will be appreciated that the light bulb 24 could be replaced by a device for producing some other perceptible signal, such as a buzzer, an annunciator or the like. However, a small light bulb is preferred, since its signal is very noticeable without being annoying, and the bulb itself is a very inexpensive, readily available and easily replaced device.

While the light bulb is a two-state signaling device, in the sense that it is either lighted or unlighted, it actually gives distinctive signals for each of three different conditions in the indicator device of this invention. In addition to steady illumination to indicate that the battery is undergoing needed charging, and flashing to indicate that the battery is fully charged, a steadily unlighted bulb indicates the absence of a.c. power, as due to inadvertent removal of the plug 13 from a socket.

In the half-wave battery charger of FIG. 2, only alternating current half-cycles of one polarity are fed to the battery during charging. Half-cycles of the opposite polarity are blocked by the single SCR 17, which is connected between input terminal 8 and output terminal 5. The regulating circuit 18 that controls gating of the SCR i7 is identical with the gating circuit for either of the SCRs 117 or 217 in FIG. 1. Again the indicator device is shown as comprising merely a lamp bulb 24; and in this case, too, the lamb bulb is connected between output terminal 5 and the center tap 16 of the winding 10.

In the absence of the indicator circuit, the output terminal 6 could be directly connected with the input terminal 9. In this case, however, terminals 6 and 9 are connected with one another through a diode 23, which corresponds generally to the diodes 123 and 223 in FIG. 1 but which serves to prevent current of the wrong polarity from being applied to the battery through the indicator circuit in by-passing relation to the SCR 17.

From the foregoing description taken with the accompanying drawing it will be apparent that this invention provides a very inexpensive but rugged and reliable indicating device for providing a readily perceptible and unambiguous signal denoting the state of charge of a storage battery connected with a full-wave regulated-voltage battery charger.

Those skilled in the art will appreciate that the invention can be embodied in forms other than as herein disclosed for purposes of illustration.

The invention is defined by the following claims:

1. In storage battery charging apparatus having a pair of output terminals to which a storage battery is connectable for charging, and which comprises a winding having two end terminals that provide an alternating voltage source and a controlled rectifier connected between one of said end terminals and one of said output terminals, said controlled rectifier having a gate connected in a regulating circuit whereby the controlled rectifier can be rendered forwardly conductive only when voltage across the output terminals is below a predetermined value corresponding to the voltage across the terminals of a substantially fully charged battery,
   means for indicating the state of charge of a storage battery connected with said output terminals, said means comprising:
   A. a lamp bulb capable of lighting with a voltage across it which is substantially lower than said value;
   B. means connecting said lamp bulb between said one output terminal and a center tap on said winding, so that the lamp bulb is energized at times when the controlled rectifier is forwardly conducting; and
   C. a rectifier diode connected between the other output terminal and the other end terminal and arranged to permit flow of current between the last mentioned terminals when the controlled rectifier is forwardly conducting, said diode preventing energization of the lamp bulb at times when the controlled rectifier is not conducting.

2. Means in a battery charger for producing a perceptible indication of the state of charge of a storage battery that has its terminals connected with output terminals of said battery charger, said battery charger being of the type comprising a winding across which an alternating voltage is induced and which has two end terminals at which such alternating voltage is available, and a controlled rectifier connected with one of said output terminals and with one of said end terminals of the winding, said controlled rectifier having a gate connected in a regulating circuit that renders the controlled rectifier forwardly conductive only when voltage across the terminals of a battery connected with said output terminals is below a value corresponding to substantially full charge of the battery, said means comprising:
   A. a two-state signaling device which assumes one perceptible state in response to a voltage across it of substantially less than said value and which assumes a perceptibly different state in the absence of voltage across it;
   B. means connecting said signaling device between said one output terminal and a terminal on the winding intermediate the ends thereof, so that said signaling device assumes its said one state when the controlled rectifier is conducting; and
   C. a rectifier diode connected between the other output terminal and the other end terminal of the winding and arranged to pass current when the controlled rectifier is conducting, said rectifier diode preventing energization of the signaling device when the controlled rectifier is not conducting.

* * * * *